Aug. 22, 1967 E. KUELZ, JR 3,337,721
COUNT BY SIX COUNTER
Filed Dec. 9, 1963
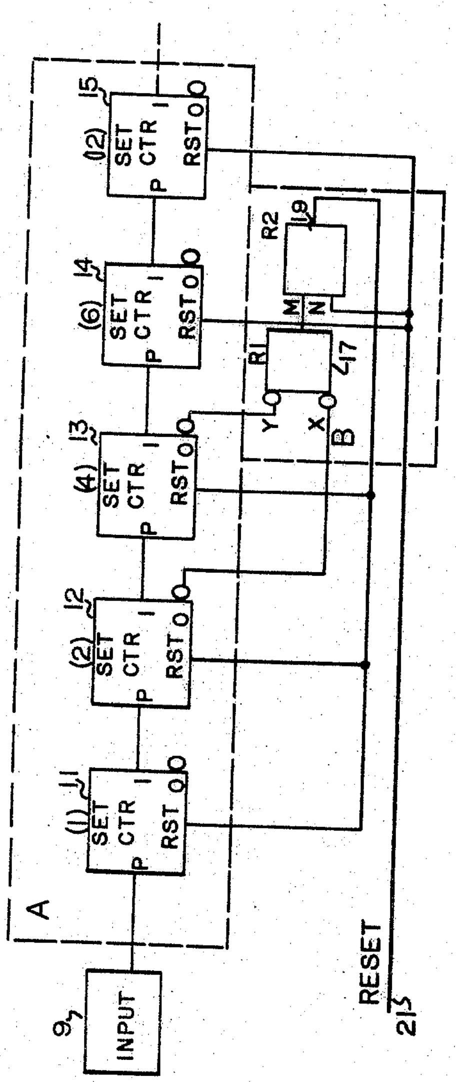
INVENTOR.
EMIL KUELZ, JR.
BY
J. T. Comfort
ATTORNEY

United States Patent Office 3,337,721

Patented Aug. 22, 1967

3,337,721

COUNT BY SIX COUNTER

Emil Kuelz, Jr., Salem, Va., assignor to General Electric Company, a corporation of New York Filed Dec. 9, 1963, Ser. No. 328,801

4 Claims. (Cl. 235—92)

ABSTRACT OF THE DISCLOSURE

A counter which counts by the integer of six has a plurality of counter bits connected in serial form for binary operation in response to input pulses to the first counter bit. The second and third counter bits are connected so that they are reset after the first through third have counted to a straight binary six. The resetting of the third counter bit sets the succeeding fourth counter bit to indicate a count of six. In this manner the fourth and subsequent counter bits indicate the multiples of the integer of six which have been counted, and the first three counter bits indicate the integer which is less than six.

This invention relates to a counter circuit, and more particularly to a counter circuit which counts by the integer of six.

Very briefly, a plurality of bistable elements are connected in serial form for binary operation in response to input pulses to the first bistable element. The second and third bistable elements are connected in a manner to be reset after the first through the third bistable elements have counted to a straight binary six. The resetting of the third bistable element sets the succeeding fourth bistable element to indicate a count of six. In this manner the fourth and subsequent bistable elements indicate the multiples of the integer of six which have been counted, and the first three bistable elements indicate the integer that is less than six.

It is an object of this invention to provide a new and improved binary counter circuit.

It is another object of this invention to provide a new and improved binary counter circuit which will count by the integer of six.

The invention is set forth with particularity in the appended claims. The principles and characteristics of the invention, as well as other objects and advantages are revealed and discussed through the medium of the illustrative embodiments appearing in the specification and drawing which follow.

In the drawing:

The figure shows a binary counter constructed according to this invention.

Referring now to the figure, a source of pulses 9 applies pulses to the pulse input terminal of counter bit 11. The "one" output terminal of counter bit 11 is connected to the pulse input terminal of counter bit 12, the "one" output terminal of counter bit 12 is connected to the pulse input terminal of counter bit 13, the "one" output terminal of counter bit 13 is connected to the pulse input terminal of counter bit 14, the "one" output terminal of counter bit 14 is connected to the pulse input terminal of counter bit 15, and the "one" output terminal of counter bit 15 is connected to the pulse input terminal of the next counter bit, if any.

The "zero" output terminal of counter bits 12 and 13 are connected to terminals X and Y, respectively, of AND/NOT circuit 17. The output from AND/NOT 17 is applied to terminal M of OR circuit 19. The input to the reset terminal 21 is applied to terminal N of OR circuit 19, and to the RST terminals of counter bits 14 and 15. The output from OR circuit 19 is applied to the reset inputs of the first three counter bits 11–13.

In the description, the term "one signal" when used refers to a −6 volt signal, and the term "zero signal" refers to a 0 volt signal.

The AND/NOT circuit 17 operates such that a zero signal on both input terminals causes a one signal to be produced on the output terminal. If a one signal is applied to one or both of the input terminals, a zero signal is applied to one or both of the input terminals, a zero signal is produced on the output terminal.

In the counter bits 11–15, a one signal applied to the SET terminal sets the counter bit to "one," so that a one signal appears at the "one" output terminal and a "zero" signal at the "zero" terminal. This one signal at the "one" output terminal will be maintained after the set signal is removed, and remains until a one signal is applied to the RST (reset) terminal, at which time the one signal at the "one" output terminal becomes a zero signal, and a one signal appears at the "zero" output terminal. In addition, a positive going pulse received on the PUL (pulse) input terminal will complement the counter bit, changing the state of the counter bit from the previous state. The shift of the counter bit will occur on the positive going side of the input signal or pulse. The "one" and "zero" output terminals are always the inverse of each other unless a one signal is simultaneously applied to the SET and RST terminal, in which case, a zero output signal will be present on both output terminals.

The OR circuit 19 operates such that a one signal on either input terminal will produce a one signal on the output terminal.

The input pulse source 9 produces a plurality of serial spaced positive going on pulses.

These circuits are in themselves well known in the prior art. Various other circuits perform similar functions and may be substituted for the circuits shown. For instance shift register bits or flip-flops properly connected may be substituted for the counter bits when connected in a straight binary counter.

The following table shows the setting of counter bits 11–15 in counting from 0 to 23 with an "X" indicating that the counter bit is set to one, and a "0" indicating that the counter bit is reset to zero. Counter bit 11 set to binary one is given a weight of a decimal one, counter bit 12 set to binary one is given a weight of a decimal two, counter bit 13 set to binary one is given a weight of a decimal 4, counter bit 14 set to binary one is given a weight of a decimal 6, and counter bit 15 set to binary one is given a weight of a decimal 12. All counter bits 11–15 reset to binary zero are given a weight of a decimal zero.

| Decimal Number | Count by Six Code | | | | |
|---|---|---|---|---|---|
| | 1 | 2 | 4 | 6 | 12 |
| 0 | 0 | 0 | 0 | 0 | 0 |
| 1 | X | 0 | 0 | 0 | 0 |
| 2 | 0 | X | 0 | 0 | 0 |
| 3 | X | X | 0 | 0 | 0 |
| 4 | 0 | 0 | X | 0 | 0 |
| 5 | X | 0 | X | 0 | 0 |
| 6 | 0 | 0 | 0 | X | 0 |
| 7 | X | 0 | 0 | X | 0 |
| 8 | 0 | X | 0 | X | 0 |
| 9 | X | X | 0 | X | 0 |
| 10 | 0 | 0 | X | X | 0 |
| 11 | X | 0 | X | X | 0 |
| 12 | 0 | 0 | 0 | 0 | X |
| 13 | X | 0 | 0 | 0 | X |
| 14 | 0 | X | 0 | 0 | X |
| 15 | X | X | 0 | 0 | X |
| 16 | 0 | 0 | X | 0 | X |
| 17 | X | 0 | X | 0 | X |
| 18 | 0 | 0 | 0 | X | X |
| 19 | X | 0 | 0 | X | X |
| 20 | 0 | X | 0 | X | X |
| 21 | X | X | 0 | X | X |
| 22 | 0 | 0 | X | X | X |
| 23 | X | 0 | X | X | X |

All counter bits 11–15 are reset to zero at the start of any counting operations by applying a one signal to reset input terminal 21, so that counter bits 11–15 are at zero as shown by decimal number "zero" in the above table.

The first pulse to be counted is applied to the PUL input terminal of counter bit 11, complementing that counter bit to one, so that the counter indicates a decimal count of one as shown in the table.

Counter bit 11 set to one, applies a one signal from its "one" output terminal to the PUL input terminal of counter bit 12. As the counter bits are complemented on the positive going side of a signal, counter bit 12 is not complemented to one at this time.

The second pulse applied to counter bit 11 complements that counter bit back to zero so that the one output signal from the "one" output terminal goes positive, complementing counter bit 12 to one. Thus, after the second input pulse counter bit 12 is at a binary "one" and counter bits 11, and 13–15 are at zero, indicating a decimal two as shown in the table.

The third pulse applied to counter bit 11 complements that counter bit back to one and counter bit 12 remains at one, indicating a decimal three as shown in the code table.

The fourth pulse applied to counter bit 11 complements that counter bit back to zero, so that the one output signal from the "one" output terminal of counter bit 11 goes positive, complementing counter bit 12 also to zero. When counter bit 12 goes to zero, the one output signal from its "one" output terminal goes positive, complementing counter bit 13 to one to indicate a decimal four as shown in the code table.

The fifth pulse applied to counter bit 11 complements that counter bit back to one, counter bit 13 remains at one, and counter bits 12, and 14–15 remain at zero, indicating a decimal 5, as shown in the table.

At a decimal count of two and three counter bit 12 is set to one, so that the "zero" output terminal of counter bit 12 applies a zero signal to terminal X of AND/NOT circuit 17. At this time counter bit 13 is reset to zero, applying a one signal from its "zero" output terminal to terminal Y of AND/NOT circuit 17, so that AND/NOT circuit 17 does not produce a one signal at this time.

At a decimal count of four and five, counter bit 13 is set to one so that the "zero" output terminal of counter bit 13 applies a zero signal to terminal Y of AND/NOT circuit 17. At this time, counter bit 12 is reset to zero applying a one signal from its "zero" output terminal to terminal X of AND/NOT circuit 17, so that AND/NOT circuit 17 does not produce a one signal at this time.

The sixth pulse applied to counter bit complements that counter bit back to zero so that the one output signal from the "one" output terminal of counter bit 11 goes positive, complementing counter bit 12 to one. At this time counter bits 12 and 13 are set to one, and counter bits 11 and 14–15 are reset to zero. Counter bits 12 and 13 set to one, apply one signal to terminals X and Y, respectively, of AND/NOT circuit 17. AND/NOT circuit 17 then applies a one signal to the RST terminals of counter bits 11–13, resetting counter bits 12 and 13 to zero. Counter bit 13, when reset to zero, has the one signal from its "one" output terminal to positive, complementing counter bit 14 to one. Counter bit 14 set to one and counter bits 1–13 and 15 reset to zero, indicate a count of decimal six, as shown in the code table.

Subsequent pulses applied to the PUL input terminal of counter bit 11 cause the above described operation to be repeated for the next count of six, when counter bit 14 is complemented to zero and counter bit 15 is complemented to one, indicating a decimal count of twelve.

A new and improved counter has been described which will count by the integer six.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. An electrical circuit responsive to successive pulses, a series of bistable elements, each having a set and reset condition, first circuit means for applying impulses to the first of said bistable elements, means connecting said series of bistable elements for binary operation in response to the impulses applied to the first of said bistable elements, and second circuit means responsive to the setting of the second and third bistable elements in the set condition and having its output directly connected to said second and third bistable elements for resetting the second and third bistable elements so that the fourth bistable element is complemented from its previous condition.

2. A binary counter for counting by the integer of six comprising a source of input pulses to be counted, a plurality of bistable elements having set and reset states connected in serial form for binary operation in response to said input pulses to the first bistable element, and means responsive to the second and third bistable elements in their set states and having its output directly connected to said second and third bistable elements for resetting said second and third elements to their reset states so that the fourth bistable element is set to its set state to indicate an integer of six.

3. A binary counter for counting by the integer of six in response to successive pulses, a series of bistable elements, each having a set and reset condition and outputs corresponding to the set and reset conditions, first circuit means for applying impulses to the first of said bistable elements, means connecting the output of each of said series of bistable elements and having its output directly connected to said second and third bistable elements to the next succeeding bistable element for binary operation, and means connected to the outputs of the second and third bistable elements for resetting the second and third bistable elements when the second and third bistable elements are set to their set condition, said third bistable element response to being reset for complementing the fourth bistable element to indicate an integer of six.

4. A binary counter for counting by the integer of six in response to successive pulses comprising a series of bistable elements, each having a set and reset condition, outputs corresponding to the set and reset conditions, a complement input and a reset input, means connecting the set output of each of said series of bistable elements to the complement input of the next succeeding bistable element for binary operation, means for applying impulses to the first of said bistable elements, an AND/NOT circuit having its inputs connected to the reset outputs of the second and third bistable elements response to both the second and third bistable elements in their set states to apply a signal to the reset inputs of the second and third bistable elements, the fourth bistable element complemented to indicate a count of an integer of six.

References Cited

UNITED STATES PATENTS

| | | | |
|---|---|---|---|
| 2,824,961 | 2/1958 | Paivinen | 235—92 |
| 2,935,685 | 5/1960 | Schneider | 328—42 X |
| 3,078,417 | 2/1963 | Nick | 315—84.6 X |

DARYL W. COOK, *Acting Primary Examiner.*

G. J. MAIER, *Assistant Examiner.*